(12) United States Patent
Ito et al.

(10) Patent No.: US 6,304,251 B1
(45) Date of Patent: Oct. 16, 2001

(54) COORDINATE INPUT DEVICE WITH FLAT CABLE HAVING TWO DIVIDED FLAT MOUNTING PARTS COMPOSING DIVIDED CONDUCTOR PORTIONS

(75) Inventors: Masaki Ito; Masato Uehara; Hiroki Shoya; Tadashi Yanagidate, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/345,877

(22) Filed: Jun. 30, 1999

(30) Foreign Application Priority Data

Jul. 6, 1998 (JP) .................................................. 10-190272

(51) Int. Cl.[7] ...................................................... G09G 5/00
(52) U.S. Cl. ......................... 345/173; 345/179; 345/178; 178/18.01
(58) Field of Search ........................... 345/156, 173–179; 178/18.01, 18.09, 18.03

(56) References Cited

U.S. PATENT DOCUMENTS

| | | |
|---|---|---|
| 5,457,289 | 10/1995 | Huang et al. . |
| 5,815,141 * | 9/1998 | Phares .................................. 345/173 |
| 5,818,430 * | 10/1998 | Heiser .................................. 345/174 |
| 5,844,175 * | 12/1998 | Nakanishi et al. ................. 178/18.03 |
| 5,869,791 * | 2/1999 | Young ............................... 178/20.01 |

* cited by examiner

Primary Examiner—Almis R. Jankus
Assistant Examiner—Amr Awad
(74) Attorney, Agent, or Firm—Brinks Hofer Gilson & Lione

(57) ABSTRACT

A coordinate input device is disclosed wherein first lead-out electrode portions formed on a lower substrate and second lead-out electrode portions formed on a film substrate are connected to conductor portions, respectively, of a flat cable and are thereby drawn out to the exterior. Therefore, unlike the prior art which requires that third lead-out electrode portions formed on a film substrate be connected to second lead-out electrode portions formed on a lower substrate with use of an electrically conductive adhesive, it is not necessary to do so. Thus, the connecting operation is easy and the coordinate input device of the present invention is superior in productivity and less expensive.

8 Claims, 7 Drawing Sheets

COORDINATE INPUT DEVICE WITH FLAT CABLE HAVING TWO DIVIDED FLAT MOUNTING PARTS COMPOSING DIVIDED CONDUCTOR PORTIONS

BACKGROUND OF THE INVENTION

1. Field of the Invention

The present invention relates to a coordinate input device wherein an operation area is operated by means of an input member such as an input pen to effect an input of data.

2. Description of the Related Art

A conventional coordinate input device will be described below with reference to FIGS. 9 to 13 all concerned with a conventional coordinate input device, of which FIG. 9 is a plan view of the device, FIG. 10 is a sectional view taken on line 10—10 in FIG. 9, FIG. 11 is a sectional view taken on line 11—11 in FIG. 9, FIG. 12 is a plan view of a lower substrate, and FIG. 13 is a rear view of a film substrate.

In the conventional coordinate input device, a lower substrate 21 formed of a transparent glass is provided with a rectangular body portion 21a and a terminal portion 21b formed in part of the body portion 21a.

On the whole of one side (upper surface) of the lower substrate 21 is formed a first transparent resistance film 22 using indium oxide.

On the transparent resistance film 22 are formed a pair of first electrode portions 23a and 23b formed of silver for example and which are parallel to each other. Between the electrode portions 23a and 23b there is formed an operation area 24 in the direction of X axis.

As shown in FIG. 12, on the transparent resistance film 22 on the lower substrate 21 there are formed a pair of first lead-out electrodes 25a and 25b formed of silver for example and drawn out from the electrode portions 23a and 23b to the terminal portion 21b while keeping out of the operation area 24 and a pair of second lead-out electrode portions 26a and 26b formed of silver for example and extending from the terminal portion 21b to the body portion 21a in the vicinity of the terminal portion 21b, the lead-out electrode portions 26a and 26b being formed spacedly from and alternately with the lead-out electrode portions 25a nd 25b.

In an exposed state of the electrode portions 23a, 23b and the operation area 24, a first insulating film 27 is formed on the transparent resistance film 22 and also on the first and second lead-out electrode portions 25a, 25b, 26a, 26b, the insulating film 27 being cut out at end portions of the second lead-out electrode portions 26a and 26b to give exposed portions 28a and 28b.

As shown in FIGS. 10, 11 and 13, a second transparent resistance film 30 is formed using indium oxide on the whole of one side (lower surface) of an upper film substrate 29, the upper film substrate 29 being formed of a transparent synthetic resin, and a pair of second electrode portions 31a and 31b formed of silver for example and parallel to each other are formed on the transparent resistance film 30 on the film substrate 29, with an operation area 32 being formed in the direction of Y axis between the electrode portions 31a and 31b.

On the transparent resistance film 30 are formed a pair of third lead-out electrode portions 33a and 33b formed of silver for example, the electrode portions 33a and 33b being drawn out in L shape from the electrode portions 31a and 31b while keeping out of the operation area 32

With the electrode portions 31a, 31b and the operation area 32 exposed, a second insulating film 34 is formed on the transparent resistance film 30 and also on the third lead-out electrode portions 33a, 33b, the insulating film 34 being cut out at end portions of the third lead-out electrode portions 33a and 33b to give exposed portions 35a and 35b. When the film substrate 29 is superimposed on the lower substrate 21, the exposed portions 35a and 35b become opposed to the exposed portions 28a and 28b.

As shown in FIG.11, an electrically conductive adhesive 36 which comprises a thermosetting or thermoplastic resin with electrically conductive particles such as silver particles is applied between the exposed portions 28a, 28b and the exposed portions 35a, 35b. With the electrically conductive adhesive 36, the electrode portions 31a and 31b are drawn out electrically to the second lead-out electrode portions 26a and 26b.

As shown in FIGS. 10 and 11, dot spacers 37 are disposed between the first and second transparent resistance films 22, 30.

The electrically conductive adhesive 36 is applied to the second exposed portions 28a and 28b of the lower substrate 21. If the film substrate 29 is superimposed on the lower substrate 21 through the dot spacers 37, allowing the exposed portions 35a and 35b to come into opposition to the exposed portions 28a and 28b and if in this state heat and pressure are applied, the thermosetting resin will cure to bond the second lead-out electrode portions 26a, 26b and the third lead-out electrode portions 33a, 33b with each other and in this bonded state the second and third lead-out electrode portions will be electrically connected together through electrically conductive particles.

As shown in FIG. 9, a flat cable 38, which is formed of a flexible synthetic resin, comprises a base portion 38a, a mounting portion 38b provided at an end of the base portion 38a, and a plurality of conductor portions 39 extending through both base portion 38a and mounting portion 38b.

The flat cable 38 is disposed so that its conductor portions 39 are opposed to the first and second lead-out electrode portions 25a, 25b, 26a, 26b of the lower substrate 21 and are connected thereto using an electrically conductive adhesive (not shown).

The connection between the conductor portions 39 and the first and second lead-out electrode portions 25a, 25b, 26a, 26b is conducted by applying an electrically conductive adhesive onto those lead-out electrode portions, placing the conductor portions 39 thereon and applying heat and pressure.

Inputted data are extracted electrically from the coordinate input device through the flat cable 38.

In operation, the film substrate 29 is pushed with an input member on its side opposite to the operation area 32, thereby causing the film substrate 29 and the second transparent resistance film 30 to be deformed and allowing the transparent resistance film 30 to come into contact with the transparent resistance film 22, whereby desired characters and patterns can be inputted. The data thus inputted are extracted from the first and second lead-out electrode portions 25a, 25b and 26a, 26b and are extracted to the exterior through the flat cable 38.

In the conventional coordinate input device, the first and second lead-out electrode portions 25a, 25b, 26a, 26b provided on the lower substrate 21 and the conductor portions 39 of the flat cable 38 are connected together using an electrically conductive adhesive and so are between the third lead-out electrode portions 33a, 33b formed on the film substrate 29 and the second lead-out electrode portions 26a, 26b formed on the lower substrate 21 using the electrically conductive adhesive 36. These connecting operations are troublesome, leading to low productivity and high cost.

Further, since the first and second lead-out electrode portions 25a, 25b and 26a, 26b are arranged in an alternate manner, the electrically conductive adhesive 36 cannot follow up a great difference in the amount of elongation caused by thermal expansion between the lower substrate 21 formed of glass and the film substrate 29 formed of a synthetic resin, thus giving rise to the problem that the electrically conductive adhesive 36 comes off and there occurs a defective connection

SUMMARY OF THE INVENTION

According to the first arrangement adopted by the present invention for solving the above-mentioned problems there is provided a coordinate input device comprising: a lower substrate having a first transparent resistance film formed on one side thereof; a pair of first electrode portions formed on the first transparent resistance film, the paired first electrode portions being parallel to each other and forming an operation area; a pair of first lead-out electrode portions formed on the first transparent resistance film, the paired first lead-out electrode portions being drawn out respectively from the paired first electrode portions and being adjacent to each other at end portions thereof; a film substrate having a second transparent resistance film formed on one side thereof; a pair of second electrode portions formed on the second transparent resistance film, the paired second electrode portions being parallel to each other and forming an operation area; a pair of second lead-out electrode portions formed on the second transparent resistance film, the paired second lead-out electrode portions being drawn out respectively from the paired second electrode portions and being adjacent to each other at end portions thereof; and a flat cable having a plurality of conductor portions, wherein the lower substrate and the film substrate are combined together in an opposed state of the first and second transparent resistance films to each other, and end portions of the paired first lead-out electrode portions and paired second lead-out electrode portions are connected respectively to the conductor portions of the flat cable.

According to the second arrangement adopted by the invention for solving the foregoing problems there is provided, in combination with the above first arrangement, a coordinate input device wherein a mounting portion of the flat cable is provided with a slit in an end portion thereof to constitute first and second divided mounting portions, the conductor portions positioned in the first divided mounting portion are connected to the paired first lead-out electrode portions, while the conductor portions positioned in the second divided mounting portion are connected to the paired second lead-out electrode portions.

According to the third arrangement adopted by the invention for solving the foregoing problems there is provided, in combination with the above first arrangement, a coordinate input device wherein a mounting portion of the flat cable is provided with an overhang portion projecting from an end portion thereof, the overhand portion being folded in two, and the conductor portions positioned in the overhang portion are connected to the paired first or second lead-out electrode portions.

DETAILED DESCRIPTION OF PREFERRED EMBODIMENTS

Figure 1:
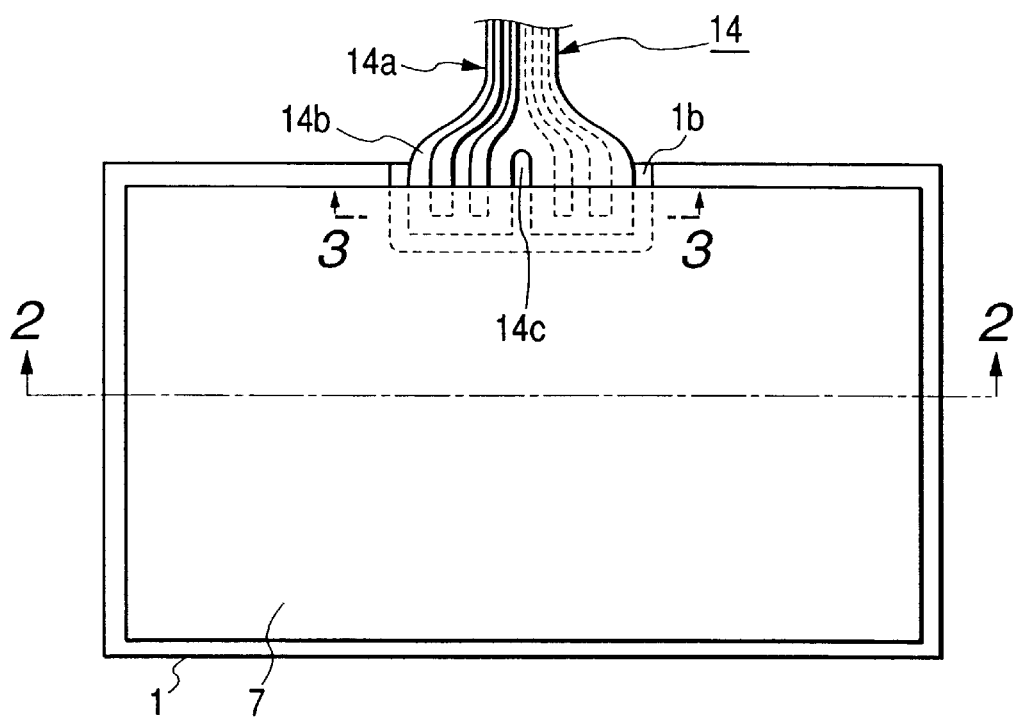
FIG. 1 is a plan view of a coordinate input device according to an embodiment of the present invention.
Figure 2:
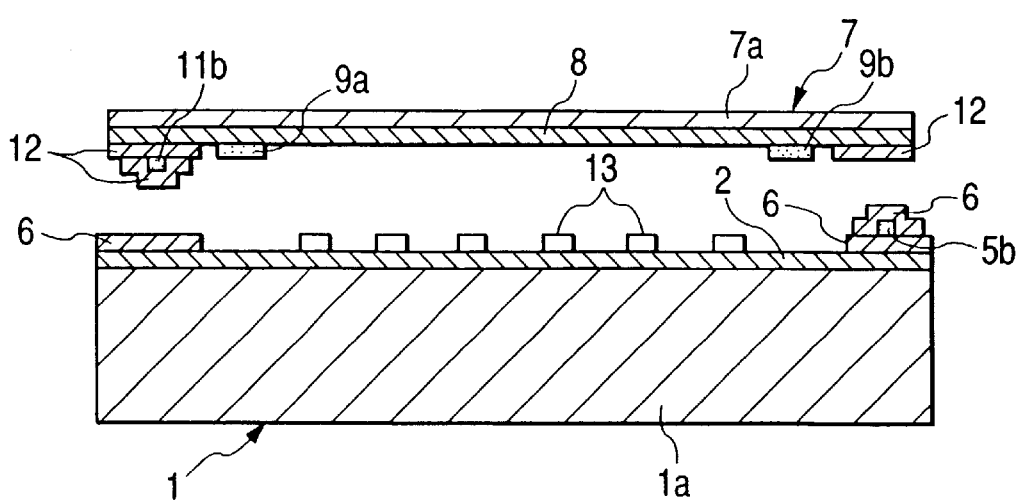
FIG. 2 is a sectional view taken on line 2—2 in FIG. 1.
Figure 3:
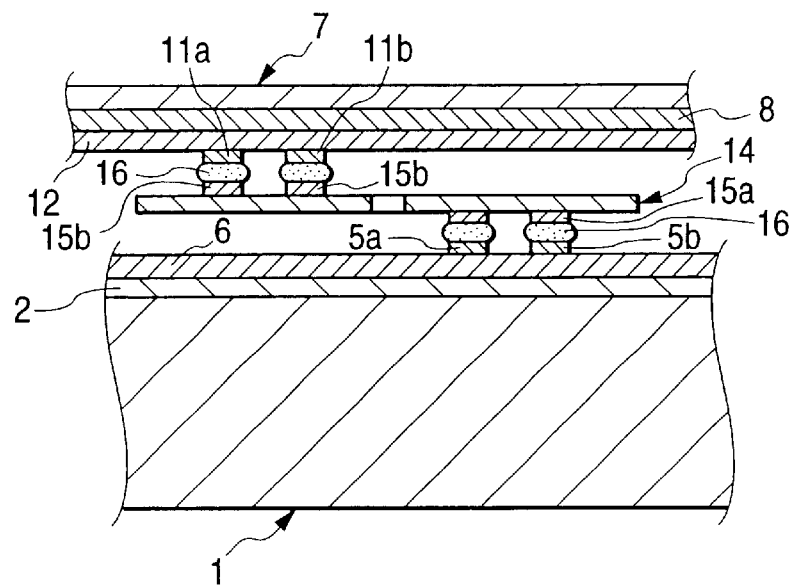
FIG. 3 is an enlarged sectional view of a principal portion taken on line 3—3 in FIG. 1.
Figure 4:
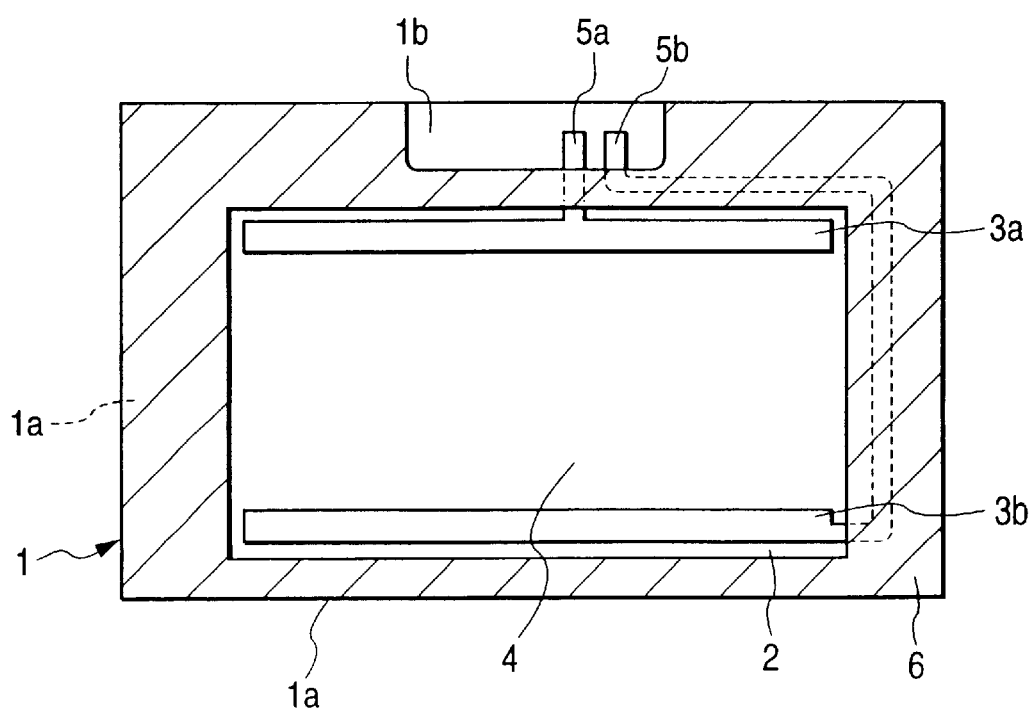
FIG. 4 is a plan view of a lower substrate used in the coordinate input device.
Figure 5:
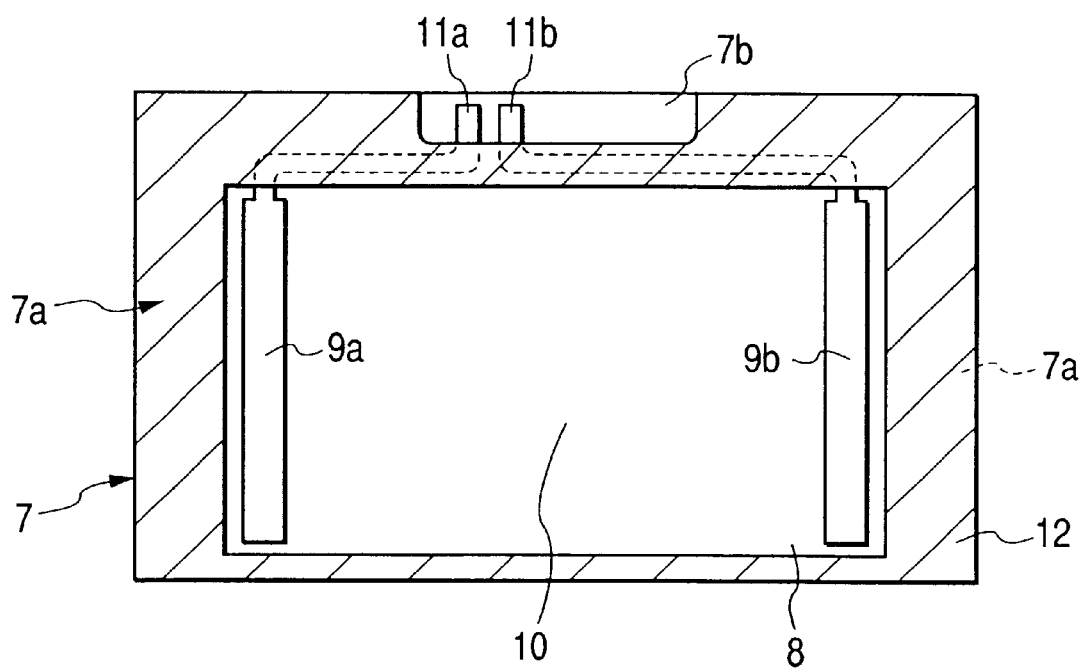
FIG. 5 is a rear view of a film substrate used in the coordinate input device.
Figure 6:
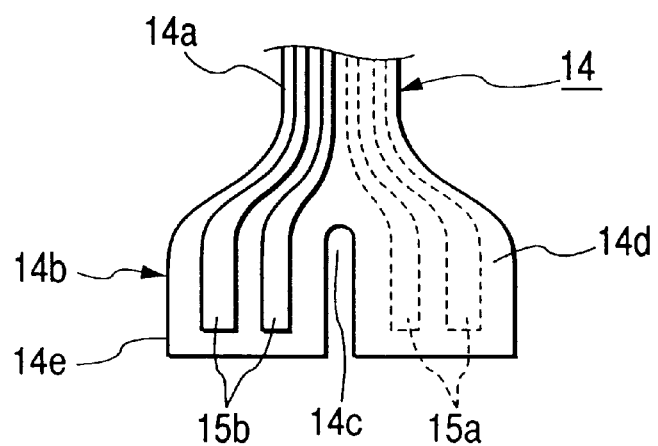
FIG. 6 is a plan view of a flat cable used in the coordinate input device.
Figure 7:
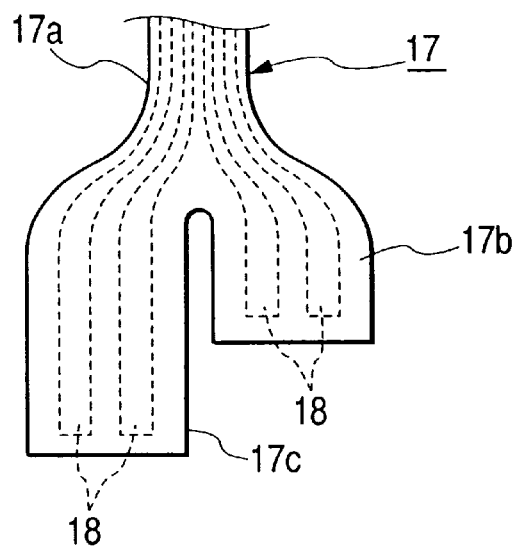
FIG. 7 is a plan view of a flat cable used in a coordinate input device according to another embodiment of the present invention.
Figure 8:
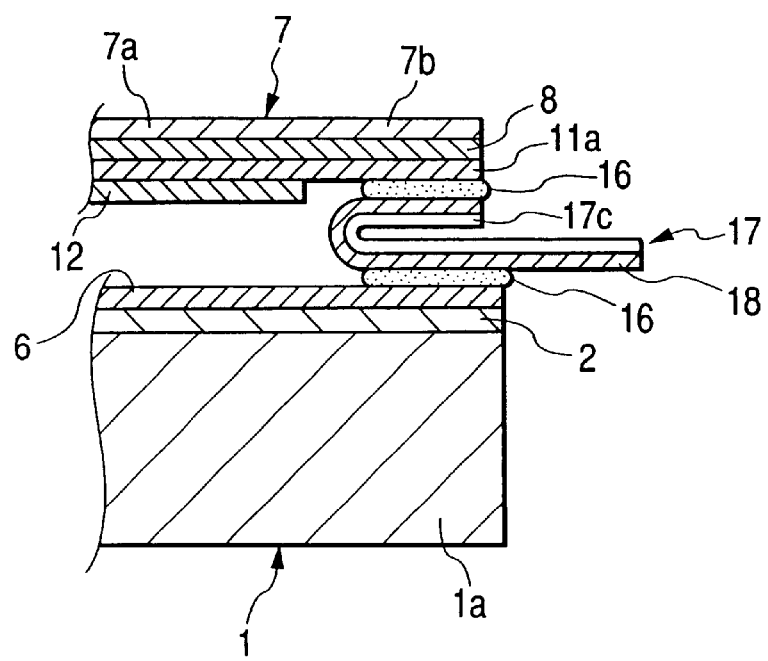
FIG. 8 is an enlarged sectional view of a principal portion, showing a mounted state of the flat cable used in the coordinate input device shown in FIG. 7.
Figure 9:
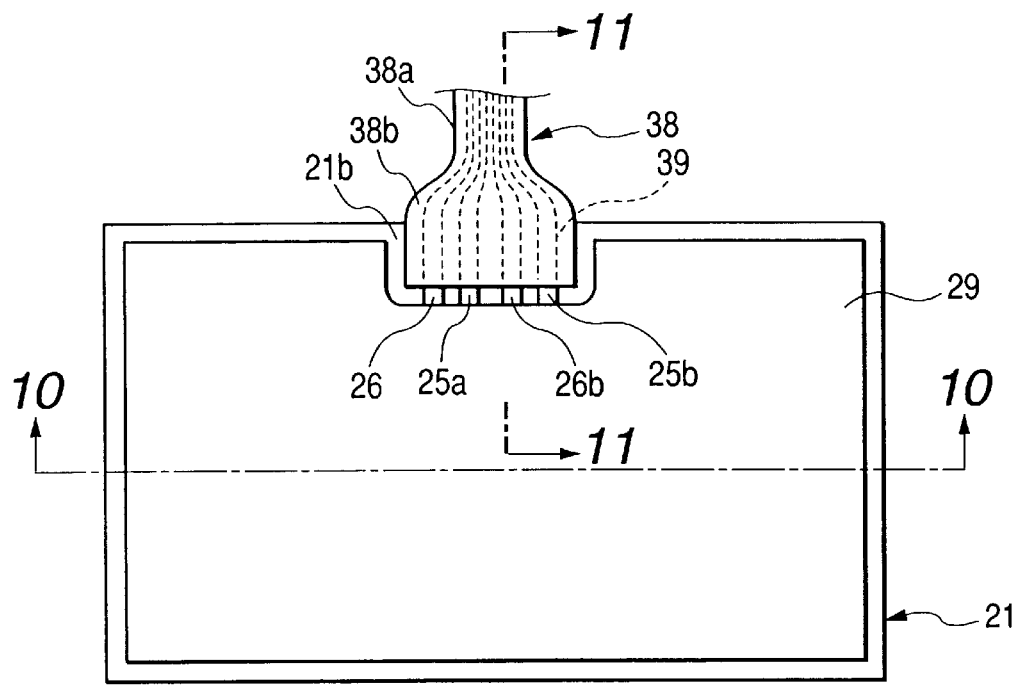
FIG. 9 is a plan view of a conventional coordinate input device.
Figure 10:
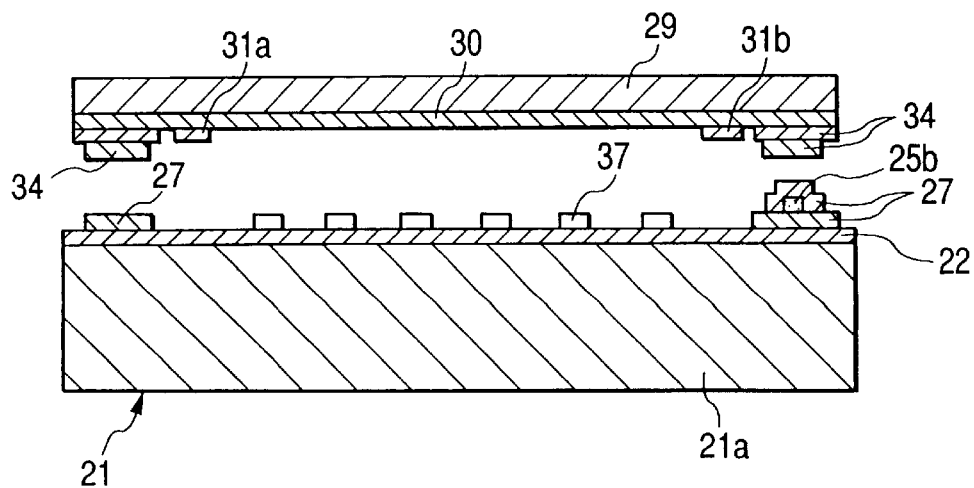
FIG. 10 is a sectional view taken on line 10—10 in FIG. 9.
Figure 11:
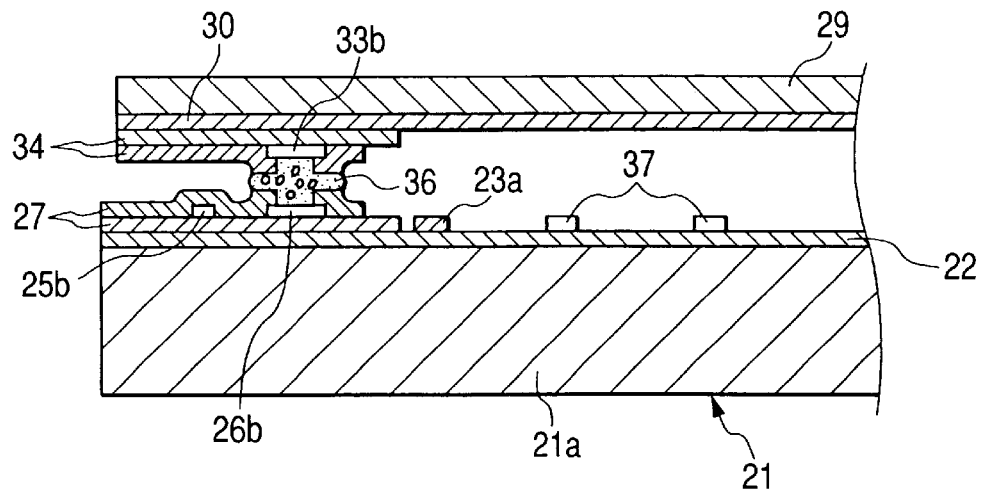
FIG. 11 is an enlarged sectional view of a principal portion taken on line 11—11 in FIG. 9.
Figure 12:
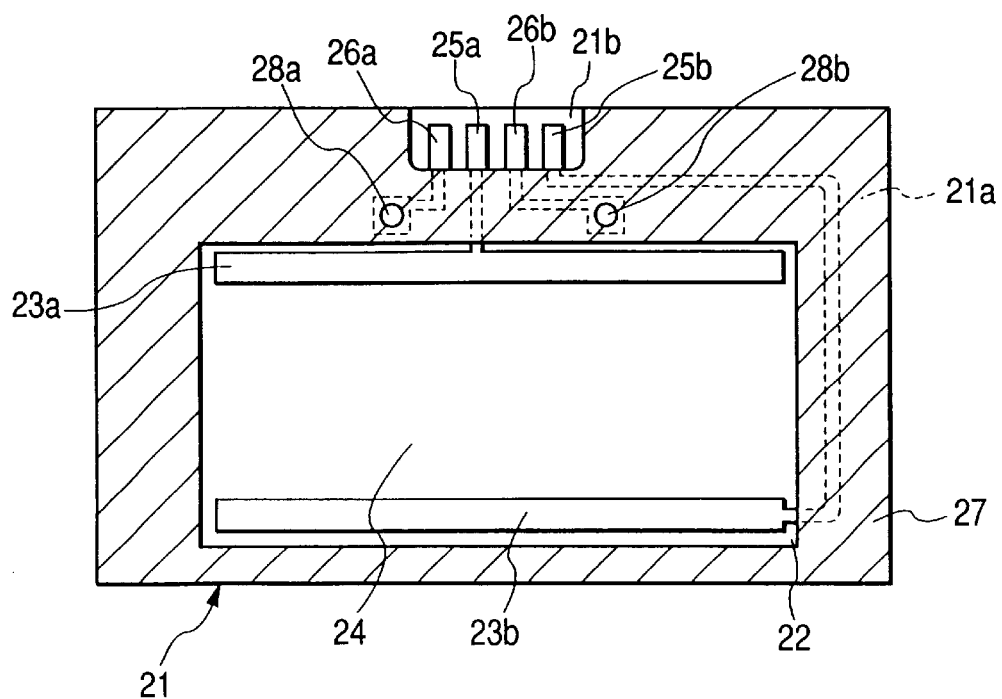
FIG. 12 is a plan view of a lower substrate used in the conventional coordinate input device.
Figure 13:
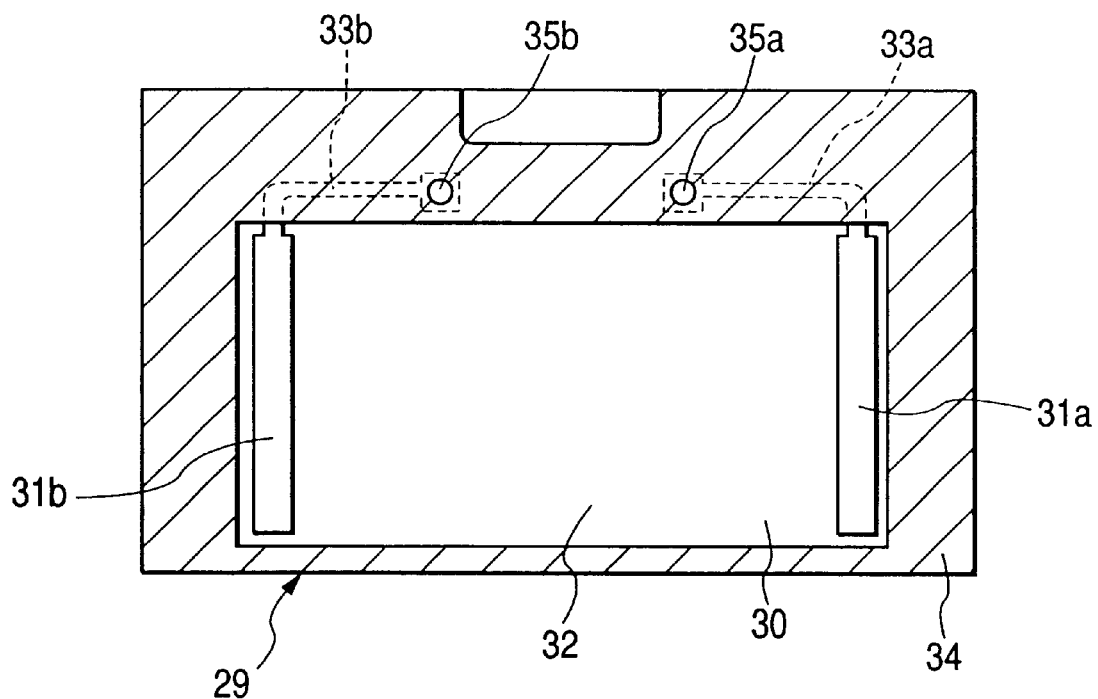
FIG. 13 is a rear view of a film substrate used in the conventional coordinate input device.

Coordinate input devices embodying the present invention will be described below with reference to FIGS. 1 to 8, of which FIG. 1 is a plan view of a coordinate input device according to an embodiment of the present invention, FIG. 2 is a sectional view taken on line 2—2 in FIG. 1, FIG. 3 is an enlarged sectional view of a principal portion taken on line 3—3 in FIG. 1, FIG. 4 is a plan view of a lower substrate used in the coordinate input device, FIG. 5 is a rear view of a film substrate used in the coordinate input device, FIG. 6 is a plan view of a flat cable used in the coordinate input device, FIG. 7 is a plan view of a flat cable used in a coordinate input device according to another embodiment of the present invention, and FIG. 8 is an enlarged sectional view of a principal portion, showing a mounted state of the flat cable used in the coordinate input device shown in FIG. 7.

In the coordinate input device according to an embodiment of the present invention, as shown in FIGS. 1 to 6, a lower substrate 1 formed of a transparent glass is provided with a rectangular body portion 1a and a terminal portion 1b formed in part of the body portion 1a.

On the whole of one side (upper surface) of the lower substrate 1 is formed a first transparent resistance film 2 using indium oxide.

On the transparent resistance film 2 are formed a pair of first electrode portions 3a and 3b parallel to each other, using silver for example, and between the electrode portions 3a and 3b is formed an operation area 4 in the direction of X axis.

As shown particularly in FIG. 4, on the transparent resistance film 2, which is formed on the lower substrate 1, there are formed a pair of first lead-out electrode portions 5a and 5b using silver for example. The first lead-out electrode portions 5a and 5b are drawn out from the electrode portions 3a and 3b to the terminal portion 1b while keeping out of the operation area 4 In the terminal portion 1b, the first lead-out electrode portions 5a and 5b are arranged so that their end portions are adjacent each other side by side.

A first insulating film 6 is formed on the transparent resistance film 2 while allowing the electrode portions 3a, 3b, operation area 4 and terminal portion 1b to be exposed. Above and below the first lead-out electrode portions 5a and 5b the first insulating film 6 is formed as upper and lower layers, and the first lead-out electrode portions 5a and 5b are exposed in the terminal portion 1b.

An upper film substrate 7, which is formed of a transparent synthetic resin, is provided with a rectangular body portion 7a and a terminal portion 7b formed in part of the body portion 7a.

On the whole of one side (lower surface) of the film substrate 7 is formed a second transparent resistance film 8 using indium oxide, and on the transparent resistance film 8 formed on the film substrate 7 there are formed a pair of second electrode portions 9a and 9b parallel to each other, using silver for example. Between the electrode portions 9a and 9b there is formed an operation area 10 in the direction of Y axis.

As shown particularly in FIG. 5, on the transparent resistance film 8, which is formed on the film substrate 7, there are formed a pair of second lead-out electrode portions 11a and 11b using silver for example, the second lead-out electrode portions 1a and 11b being drawn out from the electrode portions 9a and 9b to the terminal portion 7b while keeping out of the operation area 10 The second lead-out electrode portions 11a and 11b are arranged in the terminal portion 7b so that their end portions are adjacent each other side by side.

An insulating film 12 is formed on the transparent resistance film 8 while allowing the electrode portions 9a, 9b, operation area 10 and terminal portion 7b to be exposed. Above and below the second lead-out electrode portions 11a and 11b the second insulating film 12 is formed as upper and lower layers, and the second lead-out electrode portions 11a and 11b are exposed in the terminal portion 7b.

The lower substrate 1 and the film substrate 7 are disposed so that the first and second transparent resistance films 2, 8 are opposed to each other. As shown in FIG. 2, dot spacers 13 are provided between the first and second transparent resistance films 2, 8 and in this state the lower substrate 1 and the film substrate 7 are combined together using an adhesive (not shown).

When the lower substrate 1 and the film substrate 7 are combined together, the electrode portions 5a, 5b and the electrode portions 11a, 11b do not overlap each other vertically.

As shown in FIGS. 1 and 6, a flat cable 14 formed of a flexible synthetic resin comprises a base portion 14a, a mounting portion 14b provided at an end of the base portion 14a, first and second divided mounting portions 14d, 14e which are defined by a slit formed in an end of the mounting portion 14b, a plurality of conductor portions 15a formed on the lower surfaces of the base portion 14a and mounting portion 14b and a plurality of conductor portions 15b formed on the upper surfaces of the base portion and mounting portion, the conductor portions 15a and 15b extending over both base portion 14a and mounting portion 14b.

As shown in FIG. 3, the conductor portions 15a disposed in the first divided mounting portion 14d of the flat cable 14 are brought into opposition to the first lead-out electrode portions 5a, while the conductor portions 15b disposed in the second divided mounting portion 14e are brought into opposition to the second lead-out electrode portions 11a and 11b, and an electrically conductive adhesive 16 containing electrically conductive particles is applied between the conductor portions 15a and the first lead-out electrode portions 5a, 5b and also between the conductor portions 15b and the second lead-out electrode portions 11a, 11b. In this state, heat and pressure are applied to the lower substrate 1, flat cable 14 and film substrate 7, whereby the divided mounting portions 14d and 14e are mounted to the lower substrate 1 and the film substrate 7, and the first lead-out electrode portions 5a and 5b are connected to the conductor portions 15a, while the second lead-out electrode portions 11a and 11b are connected to the conductor portions 15b.

The coordinate input device constructed as above is operated in the following manner. The film substrate 7 is pushed on the side opposite to the operation area 10 by means of an input member, causing the film substrate 7 and the second transparent resistance film 8 to be deformed and causing the film 8 to come into contact with the first transparent resistance film 2, whereby desired characters and images can be inputted. This input is extracted from the first and second lead-out electrode portions 5a, 5b and 11a, 11b and is also extracted to the exterior through the flat cable 14.

Referring now to FIGS. 7 and 8, there is illustrated a coordinate input device according to another embodiment of the present invention. In this coordinate input device, a mounting portion 17b is provided at an end of a base portion 17a of a flat cable 17. The mounting portion 17b is provided with an overhang portion 17c projecting from an end thereof. Further, on one surface of the flat cable 17 are formed a plurality of conductor portions 18 which extend over the base portion 17a, mounting portion 17b and overhang portion 17c.

As shown in FIG. 8, the overhang portion 17c is folded in two and the conductor portions 18 located on the overhang portion 17c side are connected to second lead-out electrode portions 11a and 11b formed on a film substrate 7 side, using an electrically conductive adhesive 16, while the conductor portions 18 located on the mounting portion 17b side free of the overhang portion 17c are connected to first lead-out electrode portions 5a and 5b formed on a lower substrate 1, using an electrically conductive adhesive (not shown).

Other constructional points are the same as in the previous embodiment, so are identified by like reference numerals and explanations thereof will be omitted here.

In the coordinate input device according to the present invention, as set forth hereinabove, since the first lead-out electrode portions 5a and 5b formed on the lower substrate 1 and the second lead-out electrode portions 11a and 11b formed on the film substrate 7 are connected respectively to the conductor portions 15a and 15b of the flat cable 14 and are drawn out to the exterior, it is not necessary that the third lead-out electrode portions 33a and 33b formed on the film substrate 29 be connected to the second lead-out electrode portions 26a and 26b formed on the lower substrate 21, using the electrically conductive adhesive 36, although such a connecting operation has heretofore been required. Thus, the operation is easy and it is possible to provide a coordinate input device superior in productivity and less expensive.

Besides, since the paired first lead-out electrode portions 5a, 5b and the paired second lead-out electrode portions 11a, 11b are formed in a mutually adjacent manner at respective end portions, it is possible to shorten the spacing between the end portions. Consequently, even if there occurs elongation of the film substrate 7 due to a thermal expansion, there is no fear that the electrically conductive adhesive 16 may come off. Thus, it is possible to provide a coordinate input device capable of ensuring and stabilizing connections.

Moreover, since a slit 14c is formed in the flat cable 14 to constitute two divided mounting portions 14d and 14e, which are then connected respectively to the first lead-out electrode portions 5a, 5b of the lower substrate land the second lead-out electrode portions 11a, 11b of the film substrate 7, the influence of thermal expansions of the lower substrate 1 and film substrate 7 on both divided mounting portions 14d and 14e can be eliminated by the slit 14c, thus permitting the provision of a coordinate input device having stable and satisfactory connections.

Further, an overhang portion 17c is provided which projects from an end of the mounting portion 17b of the flat cable 17. The overhang portion 17c is folded in two and the conductor portions 18 disposed on the overhang portion 17c side are connected to the second lead-out electrode portions 11a and 11b. Therefore, as to the conductor portions 18 provided in the flat cable 17, it suffices for them to be disposed on one surface of the cable, with the result that the flat cable 17 becomes less expensive and hence it is possible to provide a less expensive coordinate input device.

What is claimed is:

1. A coordinate input device comprising:

a lower substrate having a first transparent resistance film formed on one side thereof;

a pair of first electrode portions formed on said first transparent resistance film, said paired first electrode portions being parallel to each other and forming a first operation area;

a pair of first lead-out electrode portions formed on said first transparent resistance film, said paired first lead-out electrode portions being drawn out respectively from said paired first electrode portions and being adjacent to each other and spaced apart at end portions thereof;

an upper transparent film substrate having a second transparent resistance film formed on a lower side thereof;

a pair of second electrode portions formed on said second transparent resistance film, said paired second electrode portions being parallel to each other and forming a second operation area;

a pair of second lead-out electrode portions formed on said second transparent resistance film, said paired second lead-out portions being drawn out respectively from said paired second electrode portions and being adjacent to each other and spaced apart at end portions thereof;

a flat cable having conductor portions, the conductor portions paired and correspondingly connected with said paired first lead-out electrode portions and said paired second lead-out electrode portions;

said paired first lead-out electrode portions and said paired second leadout electrode portions being arranged to be adjacent and spaced apart to each other as viewed from a direction looking through said lower substrate and said upper transparent film substrate when said upper and lower substrate are overlapped;

said paired conductor portions for said pair of first lead-out electrode portions and said paired conductor portions for said pair of second lead-out electrode portions being arranged adjacent to each other and spaced apart at said conductor portions of said flat cable;

wherein said lower substrate and said film substrate are combined together in an opposed state of said first and second transparent resistance films to each other, and end portions of said paired first lead-out electrode portions and end portions of said paired second lead-out electrode portions are connected respectively to said conductor portions of said flat cable while each of the pair of end portions is adjacent to each other;

wherein a mounting portion having a flat surface of said flat cable is provided with a slit in an end portion thereof to constitute first and second divided mounting portions, said paired conductor portions positioned in the first divided mounting portion are connected to said paired first lead-out electrode portions on the lower substrate, while said paired conductor portions positioned in the second divided mounting portion are connected to said paired second lead-out electrode portions on the upper substrate.

2. A coordinate input device according to claim 1, wherein said mounting portion is made of flexible synthetic resin.

3. A coordinate input device according to claim 1, wherein said paired first lead-out electrode portions and said paired conductor portions for said first lead-out electrode portions are electrically connected and coupled through thermosetting resin mixed with conductive particles, said paired lead-out electrode portions and said paired conductor portions for said second lead-out electrode portions are electrically connected and coupled through thermosetting resin mixed with conductive particles.

4. A coordinate input device according to claim 1, wherein said paired first lead-out electrode portions and said paired conductor portions for said first lead-out electrode portions are electrically connected and coupled through thermoplastic resin mixed with conductive particles, said paired second lead-out electrode portions and said paired conductor portions for said second lead-out electrode portions are electrically connected and coupled through thermoplastic resin mixed with conductive particles.

5. A coordinate input device comprising:

a lower substrate having a first transparent resistance film formed on one side thereof;

a pair of first electrode portions formed on said first transparent resistance film, said paired first electrode portions being parallel to each other and forming a first operation area;

a pair of first lead-out electrode portions formed on said first transparent resistance film, said paired first lead-out electrode portions being drawn out respectively from said paired first electrode portions and being adjacent to each other and spaced apart at end portions thereof;

an upper transparent film substrate having a second transparent resistance film formed on a lower side thereof;

a pair of second electrode portions formed on said second transparent resistance film, said paired second electrode portions being parallel to each other and forming a second operation area;

a pair of second lead-out electrode portions formed on said second transparent resistance film, said paired second lead-out portions being drawn out respectively from said paired second electrode portions and being adjacent to each other and spaced apart at end portions thereof;

a flat cable having conductor portions, the conductor portions paired and correspondingly connected with said paired first lead-out electrode portions and said paired second lead-out electrode portions;

said paired adjoining first lead-out electrode portions and said paired adjoining second lead-out electrode portions being arranged to be adjacent and spaced apart to each other as viewed from a direction looking through said lower substrate and said upper transparent film substrate when said upper and lower substrate are overlapped;

said paired conductor portions for said pair of first lead-out electrode portions and said paired conductor portions for said pair of second lead-out electrode portions being arranged adjacent to each other and spaced apart at said conductor portions of said flat cable;

wherein said lower substrate and said film substrate are combined together in an opposed state of said first and second transparent resistance films to each other, and end portions of said paired first lead-out electrode portions and end portions of said paired second lead-out electrode portions are connected respectively to said conductor portions of said flat cable while each of the pair of end portions is adjacent to each other;

wherein a mounting portion having a flat surface of said flat cable is provided, said mounting portion having said paired conductor portions for said pair of first lead-out electrode portions and said paired conductor portions for said pair of second lead-out electrode portions is provided with a slit in an end portion thereof to constitute first and second divided mounting portions, one surface of said first divided mounting portion is provided with said paired conductor portions for said paired first lead-out electrode portions, said second divided mounting portion is provided with said paired conductor portions for said paired second lead-out electrode portions at one surface of the same side as that of said first divided mounting portion, an end portion of one of said first and second divided mounting portions is provided with an overhang portion projected from the other ends of said first and second divided mounting portions, said conductor portions of said corresponding divided mounting portion are extended up to the end portion of said overhang portion, said overhang portion being folded in two, said conductor portions arranged at folded back portion are connected to the corresponding side electrode portions of said paired first or second lead-out electrode portions, and the conductor portions arranged at said other end portions of said first and second divided mounting portions are connected to the electrode portions at corresponding side of said paired first or second lead-out electrode portions.

6. A coordinate input device according to claim 5, wherein said mounting portion is made of flexible synthetic resin.

7. A coordinate input device according to claim 5, wherein said paired first lead-out electrode portions and said paired conductor portions for said first lead-out electrode portions are electrically connected and coupled through thermosetting resin mixed with conductive particles, said paired second lead-out electrode portions and said paired conductor portions for said second lead-out electrode portions are electrically connected and coupled through thermosetting resin mixed with conductive particles.

8. A coordinate input device according to claim 5, wherein said paired first lead-out electrode portions and said paired conductor portions for said first lead-out electrode portions are electrically connected and coupled through thermoplastic resin mixed with conductive particles, said paired second lead-out electrode portions and said paired conductor portions for said second lead-out electrode portions are electrically connected and coupled through thermo-plastic resin mixed with conductive particles.

* * * * *